July 4, 1950 — W. E. FEAZEL — 2,514,230
VEHICLE SEWAGE DISPOSAL SYSTEM
Filed Dec. 24, 1947 — 2 Sheets-Sheet 1

Inventor
William E. Feazel
By Clarence A. O'Brien
and Harvey B. Jacobson
Attorneys July 4, 1950 W. E. FEAZEL 2,514,230
VEHICLE SEWAGE DISPOSAL SYSTEM
Filed Dec. 24, 1947 2 Sheets-Sheet 2
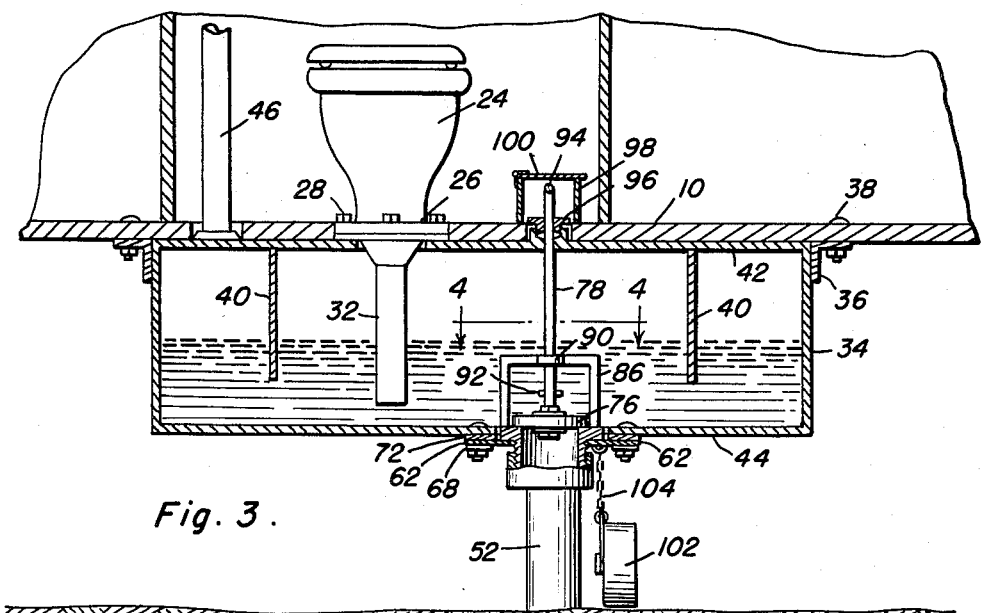
Fig. 3.
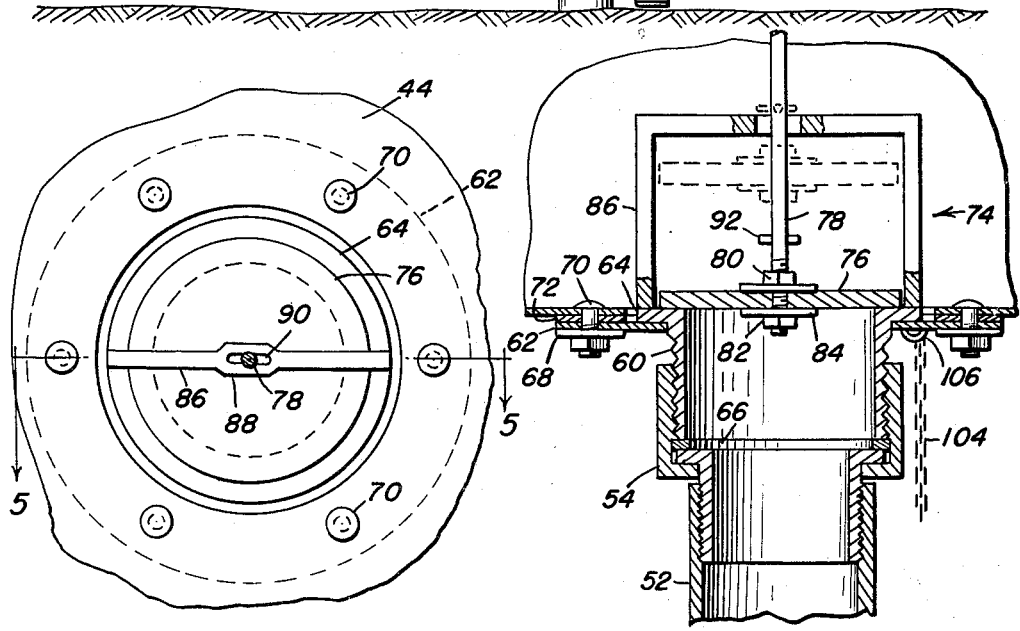
Fig. 4.
Fig. 5.
Inventor
William E. Feazel
By Clarence A. O'Brien
and Harvey B. Jacobson
Attorneys Patented July 4, 1950

2,514,230

UNITED STATES PATENT OFFICE 2,514,230

VEHICLE SEWAGE DISPOSAL SYSTEM

William E. Feazel, Jacksonville, Fla.; Pearle M. Feazel and Mildred F. Platt executrices of said William E. Feazel, deceased Application December 24, 1947, Serial No. 793,590

1 Claim. (Cl. 4—114)

This invention relates generally to sewage disposal systems, and more particularly to a sewage disposal apparatus for passenger vehicles and the combination therewith of means for connecting the apparatus on the vehicle to a sewer system provided in cities and towns.

A primary object of this invention is to provide a sewage disposal apparatus which is suitable for incorporation with passenger vehicles including house trailers, buses, railway cars, airplanes and the like.

Another object of this invention is to provide apparatus of this character which includes a tank in which proper solutions may be made, the solutions preventing the spread of communicable diseases by tending to sterilize the sewers as well as the apparatus described herein.

Still another object of this invention is to provide apparatus leading to the convenience of passengers of vehicles, generally simplifying the problem of sewage disposal, and generally improving the conditions under which such vehicles as house trailers may be lived in when such trailers are located at a distance from regular sewage disposal means.

Another object of this invention is to provide simplified means for emptying the solution tank, this means including a novel valve structure.

And a last object to be specifically mentioned is to provide a device of this character which is extremely simple, which is very inexpensive to manufacture, all the parts being constructed easily according to regular manufacturing processes, and which will give generally efficient and durable service.

With these objects definitely in view, this invention resides in certain novel features of construction, combination and arrangement of parts and portions as will be hereinafter described in the specification, particularly pointed out in the appended claim, and illustrated in the accompanying drawings which form a material part of this appliaction, and in which:

Figure 3 is a vertical sectional view, taken on the irregular section line 3—3 in Figure 1;

Figure 4 is a horizontal sectional view, taken on the line 4—4 in Figure 3;

Figure 5 is a fragmentary vertical sectional view of the valve structure, the view being taken on the line 5—5 in Figure 4, and the valve plunger, handle and structure carried thereby being shown in a second position in dash lines; and, Figure 6 is a view largely in side elevation, showing a modified form of toilet bowl and vent tube arrangement.

Similar characters of reference designate similar or identical parts and portions throughout the specification and throughout the several views of the drawings.

Figures 1, 2, 6:
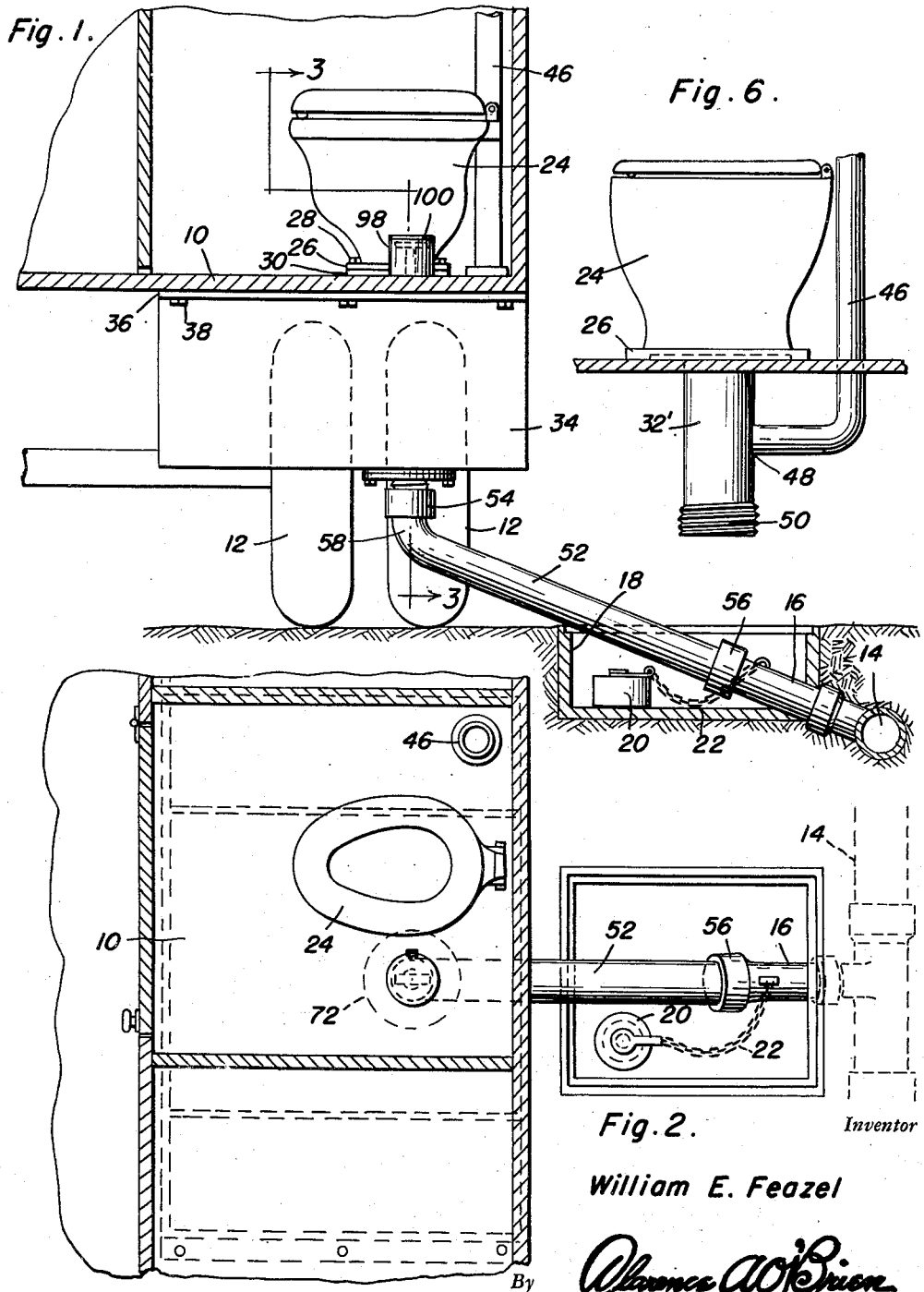
Figure 1 is a vertical sectional view, fragmentary in character, of a portion of the trailer with this invention operatively applied thereto and the apparatus used for emptying the solution tank shown operatively applied to a sewer.
Figure 2 is a horizontal sectional view of the structure shown in Figure 1, the major portion of the structure being shown in top plan, the sewer being shown in dash lines, this figure as well as Figure 1 being fragmentary in character.

Referring now to the drawings in detail, it will be noted that the environment wherewith this invention is incorporated includes a vehicle represented in the drawings as a trailer having a floor 10 and ground contacting wheels 12. This environment also includes a sewer 14 and a conduit 16 communicating with the sewer and leading upwardly therefrom. A box 18 is provided to house the upper end of this conduit 16 and a screw 20 is used to close the upper end of this conduit when the same is not in use. An attaching chain 22 is rigidly secured to the conduit and secured to the cap so that this cap may be readily screwed onto the end of the conduit.

A toilet bowl 24 having a floor flange 26 is bolted, as at 28, to the floor 10, a gasket 30 being placed between the flange 26 and the floor 10. The floor is apertured and a relatively large pipe 32 is connected to the underside of the toilet bowl and depends into the solution tank 34 which is mounted on the underside of this floor beneath the said toilet bowl.

The tank 34 may be rectangular, as illustrated in the drawings, or ay other suitable shape and it is preferred that the tank be provided with attaching flanges 36 which are apertured to receive attaching bolts 38, the flanges being on the upper end of two or more of the side walls of the tank so that the tank may be secured to any flat section of the floor surface. A plurality of baffles 40 depend from the top wall 42 of the tank to within a short distance of the floor or base 44 of the tank, in order to prevent undue splashing of solution within the tank when the vehicle is in motion.

A vent tube 46 is secured to the top wall 42 of the tank, as in Figures 1, 2 and 3, or this vent tube may be secured as at 48 in Figure 6, wherein it is shown how the vent tube may be secured to the depending pipe 32′, this modified form of pipe having a threaded terminal 50 allowing the attachment of extensions of suitable length to suit the particular installation.

It will be realized that maximum convenience in emptying the tank 34 is a feature of prime importance, and this invention contemplates the provision of a pipe 52 having terminally threaded couplings 54 and 56 at each end and bent as at 58 near one end thereof. The coupling 56 allows the convenient securement of the lower end of this pipe 52 to the upper end of the conduit 16, and the coupling 54 which is used to secure the upper end of the pipe to an externally threaded fitting 60 which is welded to an annular attachment plate 62, the fitting having a flange 64 on the upper end thereof for securement to this attachment plate. It will be understood that the fitting 60 is hollow and that this fitting is inserted through an aperture provided in the bottom wall 44 of the solution tank. A gasket 66 may be provided between the inner ends of the coupling member 54 and the adjacent end of the fitting 60. The attachment plate may be reinforced by a plurality of washers 68, preferably welded to the attachment plate and this plate is apertured so that attaching bolts 70 may be used to secure the same to the bottom wall 44 of the tank, which wall is, of course, apertured to receive these bolts and it is preferred that a gasket 72 should be inserted between the wall 44 and the adjacent portion of the plate 62.

This construction allows the removal of the fitting 60 and facilitates maintenance and repair of the valve assembly 74 which will now be described.

The flange 64 comprises a seat for the valve plate 76 which is carried on the lower end of a handle 78 secured to the center of the valve plate 76 and held thereon by nuts 80 and 82 with washers 84 interposed between the nuts and the valve plates. An inverted U-shaped bracket 86 may be welded to the outer end portions and on top of the flange 64, being disposed diametrically of this flange and having an enlarged central portion 88 apertured as at 90 to receive the handle 78 and it will be noted that the aperture is elongated to allow the passage of a stop bar 92 secured intermediate the ends of the handle 78, when this bar is turned in one direction. This construction allows the raising of the valve plate 76 into valve opening position and the retention of the valve plate in this position by rotation of the handle 78 so that the locking bar 92 is not in registry with the elongated slot 90. To facilitate the raising and rotation of the handle 78, this handle is extended upwardly through the top wall 42 of the tank and through an aperture provided in the floor 10 and the handle terminates in a T-shaped hand grip 94, disposed a short distance above the floor 10 when the valve is in closed position. A bushing 96 is provided to guide the handle 78 and to prevent escape of solution or vapors from the tank 34, and it is preferred that a receptacle 98 should be provided and secured to the floor 10 so as to house the upper end of the handle when the valve is in closed position, this receptacle having a hinged lid 100.

When the pipe 52 is removed from the fitting 60, a cap 102, internally threaded to engage the threads on the fitting 60, is used to assure the closure of the outlet of the tank, this cap 102 being linked to the attachment plate 62 by a chain 104, the attachment plate having an eye 106 welded thereon for this purpose.

The operation of this invention will be clearly understood from the foregoing description of the mechanical details thereof, taken in connection with the above recitation of the objects sought to be achieved by this invention. Further description is, therefore, thought to be unnecessary.

Many minor variations may be made in the structure and proportionment of the various elements without departure from the spirit and scope thereof. Accordingly, this invention should be limited only by a proper interpretation of the terminology used in the claim subjoined hereto.

Having described the invention, what is claimed as new is:

Sewage disposal apparatus for a passenger vehicle having a floor, comprising a toilet bowl secured to the floor of said vehicle, a tank carried by said vehicle disposed beneath said floor and communicating with said toilet bowl, an outlet for said tank adjacent the bottom thereof, a pipe having one end removably securable to said outlet and having the other end securable to a sewer, and a closure means for closing said outlet when said pipe is removed therefrom, said closure means including a valve and valve actuating means extending through said tank and through said floor for operation of the valve from within the vehicle, said actuating means including a handle connected to a valve plunger of the valve, an inverted U-shape bracket secured to and within the tank and having a slot in the bight portion thereof to receive an intermediate portion of said valve handle, said handle having a member of elongated form and shorter than said slot and disposed transversely of the handle to hold the plunger in a valve opening position when the handle is rotated about its longitudinal axis.

WILLIAM E. FEAZEL.

REFERENCES CITED

The following references are of record in the file of this patent:

UNITED STATES PATENTS

| Number | Name | Date |
|---|---|---|
| 1,439,748 | Moore | Dec. 26, 1922 |
| 1,715,116 | Carpenter et al. | May 28, 1929 |
| 2,011,511 | Bennett et al. | Aug. 13, 1935 |
| 2,094,537 | Hinds | Sept. 28, 1937 |